(12) United States Patent
Khatri et al.

(10) Patent No.: US 12,074,988 B2
(45) Date of Patent: Aug. 27, 2024

(54) FACTORY MANAGEMENT OF REGIONAL CRYPTOGRAPHIC ALGORITHMS IN AN INFORMATION HANDLING SYSTEM

(71) Applicant: Dell Products, L.P., Round Rock, TX (US)

(72) Inventors: Mukund P. Khatri, Austin, TX (US); Eugene David Cho, Austin, TX (US); Milton Olavo Decarvalho Taveira, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 226 days.

(21) Appl. No.: 17/813,635

(22) Filed: Jul. 20, 2022

(65) Prior Publication Data

US 2024/0031173 A1  Jan. 25, 2024

(51) Int. Cl.
*H04L 29/06* (2006.01)
*H04L 9/14* (2006.01)
*H04L 9/30* (2006.01)
*H04L 9/32* (2006.01)

(52) U.S. Cl.
CPC .............. *H04L 9/3268* (2013.01); *H04L 9/14* (2013.01); *H04L 9/30* (2013.01)

(58) Field of Classification Search
None
See application file for complete search history.

(56) References Cited

U.S. PATENT DOCUMENTS

| | | | | |
|---|---|---|---|---|
| 8,689,290 B2 * | 4/2014 | Buer | ........................ | H04L 9/32 713/168 |
| 9,239,920 B2 * | 1/2016 | Ashkenazi | ............ | H04L 9/0866 |
| 9,325,509 B2 * | 4/2016 | Sato | ...................... | G06F 21/335 |
| 2011/0197077 A1 * | 8/2011 | Chan | ...................... | G06F 21/10 713/189 |
| 2017/0346639 A1 * | 11/2017 | Muftic | .................. | H04L 9/3247 |
| 2021/0036861 A1 * | 2/2021 | Medvinsky | ........... | H04L 9/0631 |
| 2022/0095109 A1 * | 3/2022 | Yu | ........................ | H04L 63/062 |

* cited by examiner

*Primary Examiner* — Maung T Lwin
(74) *Attorney, Agent, or Firm* — Fogarty LLP (57) ABSTRACT

Systems and methods for factory management of regional cryptographic algorithms in an Information Handling System (IHS) are described. In an embodiment, an IHS may include: a host processor; a security processor coupled to the host processor; and a memory coupled to the security processor, the memory having program instructions stored thereon that, upon execution, cause the security processor to: generate a Cryptographic Algorithm Identity (CAI) key pair comprising a CAI public key and a CAI private key; issue a CAI Certificate Signing Request (CSR) to a factory IHS, where the CAI CSR comprises the CAI public key; receive a signed CAI certificate from the factory IHS, where the signed CAI certificate is usable to activate a selected set of regional cryptographic algorithms among a superset of regional cryptographic algorithms stored, during manufacturing of the IHS, in a firmware of the security processor; and store the signed CAI certificate.

20 Claims, 5 Drawing Sheets

FACTORY MANAGEMENT OF REGIONAL CRYPTOGRAPHIC ALGORITHMS IN AN INFORMATION HANDLING SYSTEM

FIELD

This disclosure relates generally to Information Handling Systems, and, more specifically, to systems and methods for factory management of regional cryptographic algorithms in an IHS.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for factory management of regional cryptographic algorithms in an Information Handling System (IHS) are described. In an illustrative, non-limiting embodiment, an IHS may include a host processor, a security processor coupled to the host processor, and a memory coupled to the security processor, the memory having program instructions stored thereon that, upon execution, cause the security processor to: generate a Cryptographic Algorithm Identity (CAI) key pair comprising a CAI public key and a CAI private key; issue a CAI Certificate Signing Request (CSR) to a factory IHS, where the CAI CSR comprises the CAI public key; receive a signed CAI certificate from the factory IHS, where the signed CAI certificate is usable to activate a selected set of regional cryptographic algorithms among a superset of regional cryptographic algorithms stored, during manufacturing of the IHS, in a firmware of the security processor; and store the signed CAI certificate.

To generate the CAI public key, the program instructions, upon execution, may cause the security processor to obtain a unique identifier (ID) from the IHS. The signed CAI certificate may include a manifest of the selected set of regional cryptographic algorithms, a location of factory, and a time of creation of the signed CAI certificate.

The set of regional cryptographic algorithms may be selected based, at least in part, upon a location of the factory. Additionally, or alternatively, the set of regional cryptographic algorithms may be selected based, at least in part, upon a geographic region where the IHS is expected to be shipped. For example, the geographic region may be selected from the group consisting of: United States, Russia, China, and Europe.

In some cases, the superset of regional cryptographic algorithms comprises: a Secure Hash Algorithm 3 (SHA3), a SHA2, a Streebog hash function, and an SM3 hash function. To determine that the validated CAI certificate belongs to the IHS, the program instructions, upon execution, may cause the security processor to compare a public key or serial number of the IHS against a public key or serial number stored in the validated CAI certificate. The activated set of selected set of regional cryptographic algorithms may be usable by the secure processor to perform a cryptographic operation requested by the host processor via an Application Programming Interface (API).

The program instructions, upon execution, may cause the security processor to: during boot of the IHS, validate the signed CAI certificate; determine that the validated CAI certificate belongs to the IHS; and in response to the determination, activate the selected set of regional cryptographic algorithms. The program instructions, upon execution, may cause the security processor to: receive a request to attest a set of cryptographic algorithms usable by the host processor to perform a cryptographic operation; and in response to the request, prove possession of the CAI private key.

In some cases, the selected set of regional cryptographic algorithms may be different from another set of regional cryptographic algorithms previously activated during manufacturing of the IHS. Activation of the selected set of regional cryptographic algorithms may occur without any changes to the superset of regional cryptographic algorithms and/or without any updates to the firmware.

In another illustrative, non-limiting embodiment a method may include sending a CAI CSR to a factory of an IHS by a security processor of the IHS, where the CAI CSR comprises a CAI public key; and storing, by the security processor, a signed CAI certificate received from the factory, where the signed CAI certificate is usable to activate a selected set of regional cryptographic algorithms among a superset of regional cryptographic algorithms stored in a firmware of the security processor during manufacturing of the IHS.

The method may include, during booting of the IHS, validating the signed CAI certificate; determining that the validated CAI certificate belongs to the IHS and, in response to the determination, activating the selected set of regional cryptographic algorithms. The method may also include: receiving a request to attest a set of cryptographic algorithms used by a host processor of the IHS to perform a cryptographic operation and, in response to the request, proving possession of a CAI private key by the security processor.

In yet another illustrative, non-limiting embodiment, a memory storage device may have program instructions stored thereon that, upon execution by an IHS, cause the IHS to: receive a CAI CSR from a security processor of another IHS serviced or manufactured at least in part by the IHS, where the CAI CSR comprises a CAI public key, and produce a signed CAI certificate usable by the security processor to activate a selected set of regional cryptographic algorithms among a superset of regional cryptographic algorithms stored in a firmware of the security processor.

The set of regional cryptographic algorithms may be selected based, at least in part, upon a location of the IHS. Additionally, or alternatively, the set of regional cryptographic algorithms may be selected based, at least in part, upon a geographic region where the other IHS is expected to be shipped, and the geographic region may be selected from the group consisting of: United States, Russia, China, and Europe.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

Cryptography is the foundation of IHS security. Yet cryptographic requirements differ depending upon where in the world an IHS is shipped by its manufacturer because individual countries take it upon themselves to decide which systems to trust. For example, IHSs shipped to U.S. customers include a Trusted Platform Module (TPM), but IHSs shipped to Russia must not have a TPM. Meanwhile, IHSs shipped to China must include a Trusted Cryptographic Module (TCM) instead—yet another part that the manufacturer must maintain.

In today's manufacturing environment, there is little time to comply with governmental requirements, which often puts sales at risk and can also impact IHS design. In addition, the current turnaround time for firmware updates is much longer than what is necessary to adapt to dynamic regional cryptography policy changes, which requires that multiple regional flavors of firmware be produced (or requires customer configurability, itself a security issue). To address these, and other concerns, various systems and methods described herein may provide secure cryptographic modularity to an IHS and enable the factory management of regional cryptographic algorithms usable by the IHS.

Figure 1:
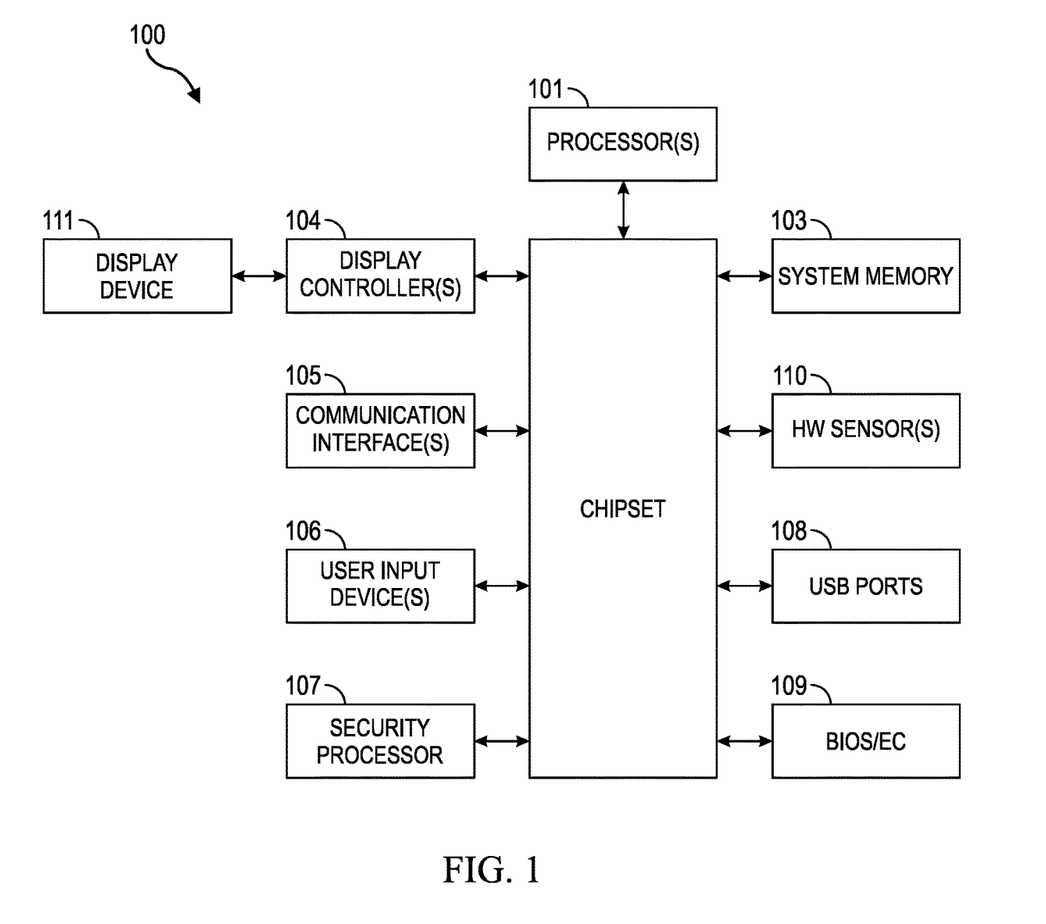
FIG. 1 depicts a diagram of examples of components of an Information Handling System (IHS), according to some embodiments.

FIG. 1 is a block diagram of components of IHS 100, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BT, cellular or mobile networks (e.g., code-division multiple access or "CDMA," time-division multiple access or "TDMA," Long-Term Evolution or "LTE," etc.), satellite networks, or the like. In some cases, communication interface(s) 105 may be used to communicate with devices (e.g., BT speakers, microphones, headsets, etc.). Moreover, interface(s) 105 may be coupled to chipset 102 via a PCIe bus.

Chipset 102 may be coupled to display controller(s) 104, which may include one or more or graphics processor(s) (GPUs) on a graphics bus, such as an Accelerated Graphics Port (AGP) or Peripheral Component Interconnect Express (PCIe) bus. As shown, display controller(s) 104 provide video or display signals to display device 111. In other implementations, any number of display controllers or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, enable a collaboration mode for a touchpad coupled or integrated into IHS 100.

Chipset 102 may provide components of IHS 100 (e.g., processor(s) 101) with access to security processor 107. In various embodiments, security processor 107 may include a chip or core dedicated to providing encryption or other security operations to IHS 100. For example, security processor 107 may include a Trusted Platform Module (TPM) configured to securely store encryption keys and measurements that help verify the integrity of IHS 100. Additionally, or alternatively, a TPM-like architecture of security processor 107 may be integrated into processor(s) 101, EC 109, a Baseband Management Controller (BMC), a storage controller, etc. Other examples of security processor(s) 107 include, but are not limited to: AMD's PLATFORM SECURITY PROCESSOR (PSP), MICROSOFTS's PLUTON, INTEL's CONVERGED SECURITY AND MANAGEMENT ENGINE (CSME), etc.

In some embodiments, security processor 107 may include registers, such as platform configuration registers (PCRs), and secure storage, such as a Non-Volatile Random-Access Memory (NVRAM). Security processor 107 may also include a cryptographic processor that supports various cryptographic capabilities. For example, a pre-boot process implemented by security processor 107 may utilize its cryptographic capabilities to calculate hash values that are based on software and/or firmware instructions utilized by certain core components of IHS 100. These calculated hash values may then be compared against reference hash values that were previously stored in a secure non-volatile memory, such as during factory provisioning of IHS 100. In this manner, security processor 107 may establish a root of trust that includes core components of IHS 100 validated as operating using instructions that originate from a trusted source.

Security processor 107 may include a superset of all regional cryptographic algorithms available and/or relevant at the time of IHS 100's production. When IHS 100 is manufactured or serviced (e.g., by an Original Equipment Manufacturer or "OEM"), a factory or service facility IHS (equipped with a hardware security module or "HSM" configured to protect cryptographic keys, lifecycles, and infrastructures) selects one or more regional cryptographic algorithms among the superset of regional cryptographic algorithms to be activated in security processor 107, to the exclusion of all others.

In various implementations, only a factory IHS (i.e., an IHS at an OEM's factory that produces IHS 100 containing security processor 107) may be capable of changing a previous regional cryptographic algorithm selection (e.g., during servicing of IHS 100 following its manufacturing). Moreover, because all regional cryptographic algorithms available are included in security processor 107 out of the factory, subsequent changes to which regional cryptographic algorithms should be activated (e.g., in response to governmental policy changes, etc.) can take place independently of and/or without any changes to security processor 107's firmware.

In some cases, regional cryptographic algorithm(s) may be selected, for example, based at least in part upon: a location of the IHSs factory (e.g., for customers who want US-built IHSs, with the US algorithm's activation occurring on US soil); a customer shipping destination (e.g., if a China-built IHS is shipped to Germany, the selection is aligned with EU requirements); and/or customer choice (i.e., the customer selects what algorithms they want used in their product). Certain embodiments may be implemented as part of a "personality module" outside of the security processor's firmware image and can also apply to whole or portions of the firmware image.

In some embodiments, chipset 102 may also provide access to one or more hard drives, solid state drives, optical drives, or other removable-media drives. In certain embodiments, chipset 102 may also provide access to one or more Universal Serial Bus (USB) ports 108, to which one or more peripheral devices may be coupled (e.g., internal or external webcams, microphones, speakers, etc.).

Chipset 102 may further provide access to one or more user input devices 106, for example, using a super I/O controller or the like. Examples of user input devices 106 include, but are not limited to, a keyboard, mouse, touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Sensors 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. BIOS 109 provides an abstraction layer that allows the OS to interface with certain hardware components that are utilized by IHS 100. Via the hardware abstraction layer provided by BIOS 109, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS 109 is intended to also encompass a UEFI component.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

In some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

EC 109 may also implement operations for detecting certain changes to the physical configuration or posture of IHS 100 and managing the modes of a touchpad or other user input device 106 in different configurations of IHS 100. For instance, where IHS 100 as a 2-in-1 laptop/tablet form factor, EC 109 may receive inputs from a lid position or hinge angle sensor (e.g., one or more of sensors 110), and it may use those inputs to determine: whether the two sides of IHS 100 have been latched together to a closed position or a tablet position, the magnitude of a hinge or lid angle, etc.

EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component. Such hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. In this manner, EC 109 may validate the integrity of hardware and software components installed on IHS 100.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be executed by components integrated into processor(s) 101 as systems-on-a-chip (SoC). As such, in various embodiments, IHS 100 may be implemented as different classes of computing devices including, but not limited to: servers, workstations, desktops, laptops, appliances, video game consoles, tablets, smartphones, etc.

Figure 2:
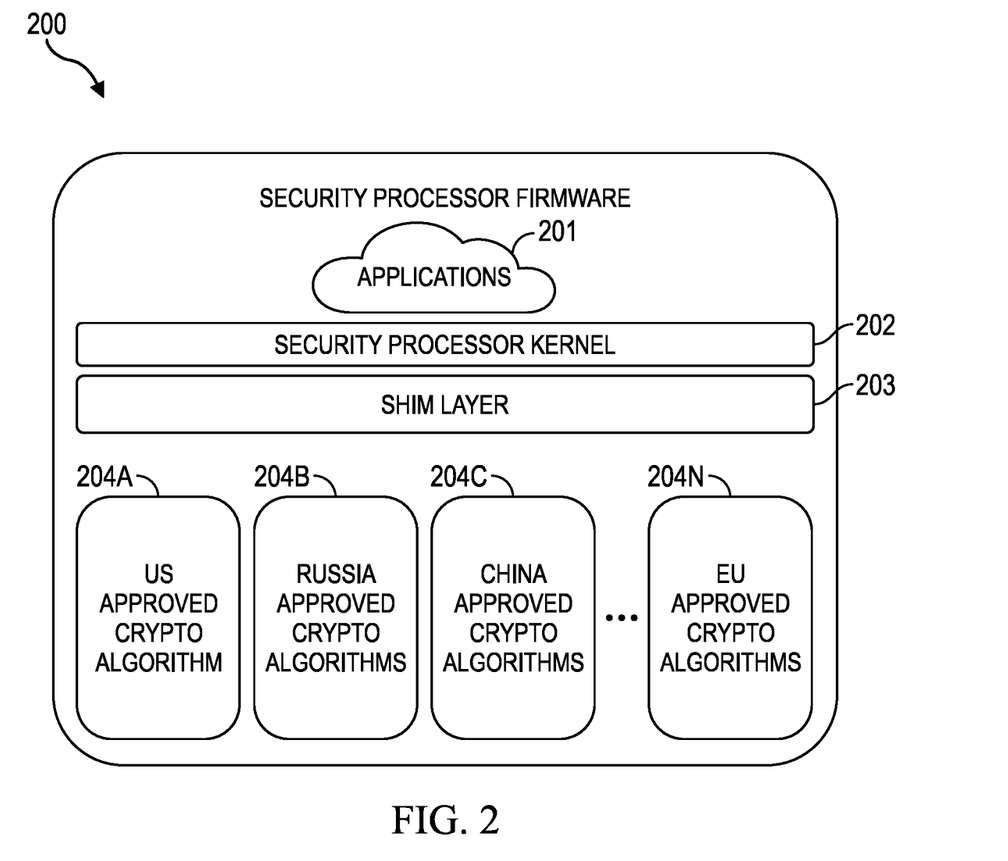
FIG. 2 depicts a diagram of an example of security processor firmware, according to some embodiments.

FIG. 2 depicts a diagram of an example of security processor firmware 200. Particularly, firmware 200 includes program instructions that, upon execution by security processor 107, are configured to instantiate applications 201, kernel 202, and shim layer 203. Applications 201 include any security application or operation performable by security processor 107 (e.g., any encryption, decryption, key derivation, digital certificate signing, verification, etc.). Kernel 202 includes core routines that expose and manage the capabilities of security processor 107 to applications 201. Shim layer 203 includes a library configured to transparently intercept an Application Programming Interface (API) command, change the parameters therein, handle the command itself, and/or redirect the command elsewhere.

Through shim layer 203, a factory-selected one or more cryptographic algorithms, among a superset of regionally approved cryptographic algorithms 204A-N (e.g., US, Russia, China, EU, etc.), may be accessible to applications 201. Additionally, or alternatively, applications 201 may include one or more APIs for communications with other IHS components (e.g., processor 101). In those cases, security processor 107 may perform security operations using a factory-selected one of algorithms 204A-N at the request of the other IHS component.

Figure 3:
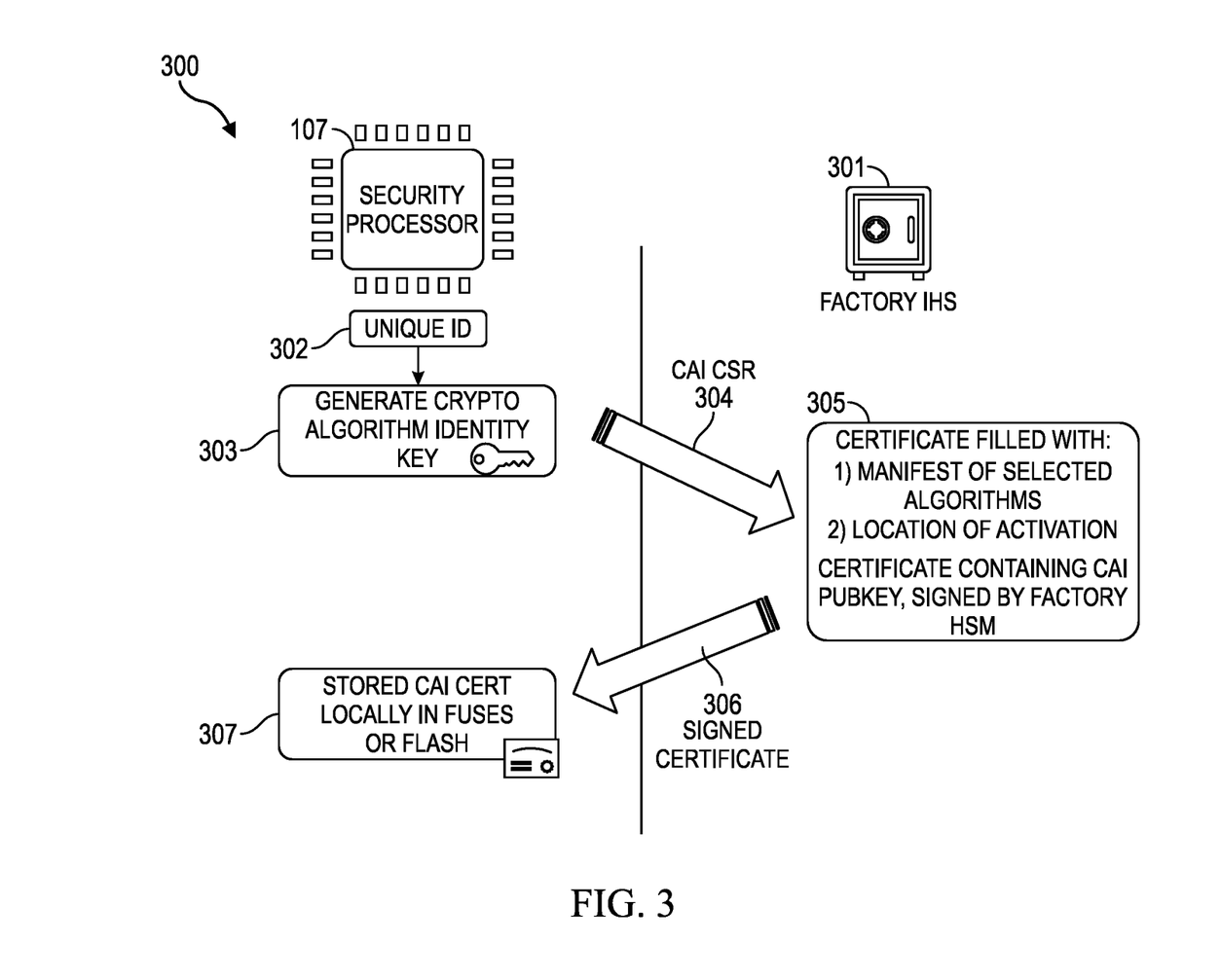
FIG. 3 depicts a diagram of an example of a method for creating a Cryptographic Algorithm Identity (CAI) certificate, according to some embodiments.

FIG. 3 depicts a diagram of an example of method 300 for creating a Cryptographic Algorithm Identity (CAI) certificate. At 302, security processor 107 retrieves an IHS unique ID (e.g., service tag, serial number, MAC address, etc.). At 303, security processor 107 uses the unique ID to generate a CAI public key. At 304, security processor 107 issues a CAI Certificate Signing Request (CSR) to factory IHS 301 (e.g., an HSM). The CAI CSR of 304 may include a copy of the CAI public key.

At 305, factory IHS 301 creates a CAI digital certificate that includes a manifest of regional cryptographic algorithms selected specifically for IHS 100, as well as a location and/or time of the activation. In some embodiments, factory IHS 301 may submit the CAI CSR for signing by a distinct factory Certificate Authority (CA). Factory IHS 301 may specify a factory key to be used by the factory CA in signing the CAI certificate. Based on the information parsed from the CSR, the factory CA may generate a CAI digital certificate associated with the CAI public key and thereby it may specify the selected set of regional cryptographic algorithms usable by IHS 100. In some implementations, the factory CA may also select a certificate name or ID associated with a signing key maintained by factory IHS 301.

At 306, factory IHS 301 utilizes a private key to sign the CAI certificate. The signed CAI certificate received by security processor 107 includes a copy of the CAI public key. At 307, security processor 107 stores the signed CAI certificate locally in fuses or flash memory.

In some embodiments, the signed CAI certificate may be usable by security processor 107 to activate a selected set of regional cryptographic algorithms among a superset of regional cryptographic algorithms 204A-N stored, during manufacturing of IHS 100, in firmware 200. Additionally, or alternatively, the signed CAI certificate may be usable to prove the IHS 100 and/or security processor 107's ability or authorization, by factory IHS 301, to use a selected set of regional cryptographic algorithms. In some cases, another entity (e.g., a storage controller in the IHS, SmartNIC/DPU in the IHS, a remote entity outside of the IHS, etc.) may ask security processor 107 to prove or attest which regional security should be running.

Figure 4:
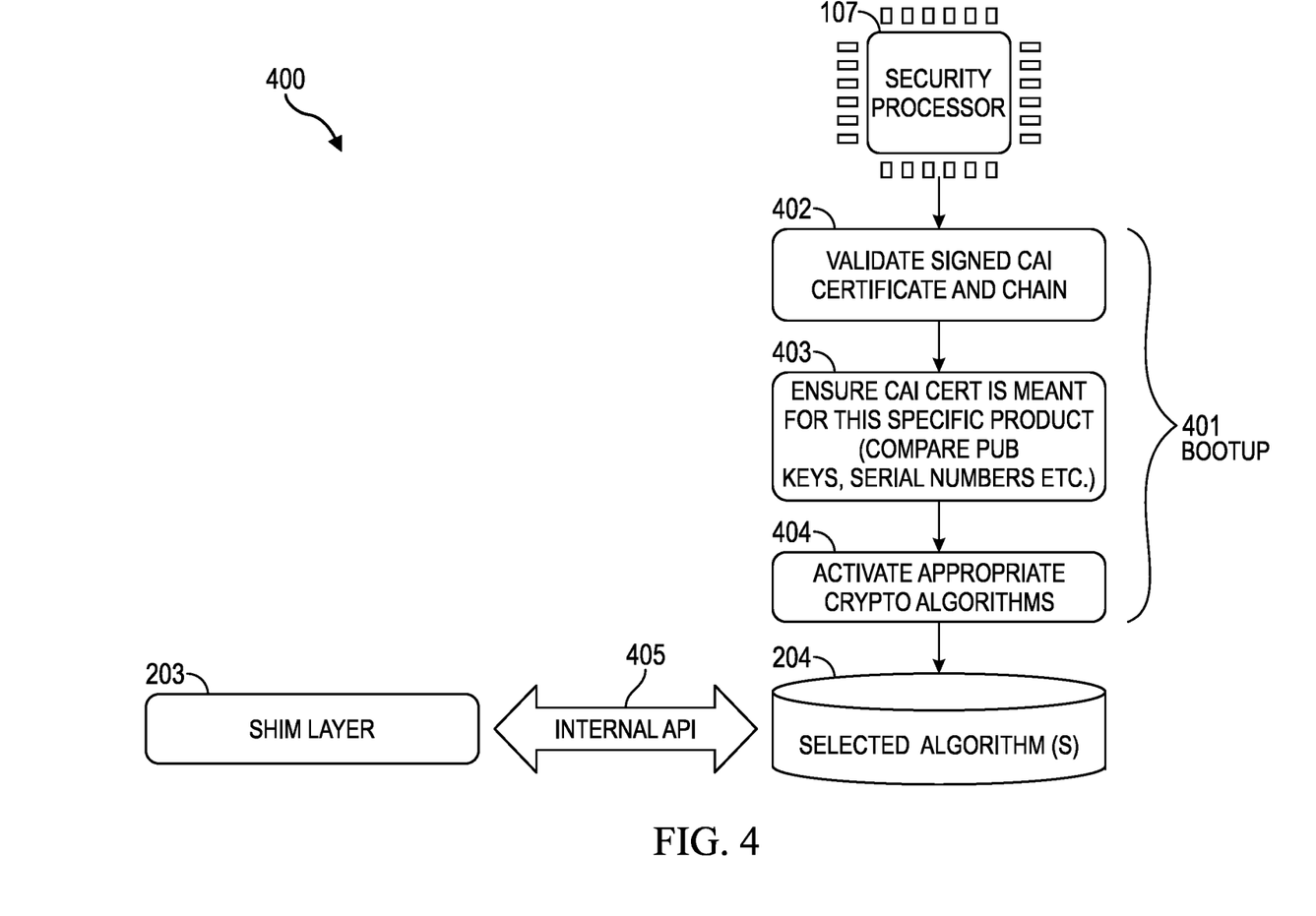
FIG. 4 depicts a diagram of an example of a method for validating a CAI certificate during bootup, according to some embodiments.

FIG. 4 depicts a diagram of an example of method 400 for validating a CAI certificate during bootup 401. At 402, security processor 107 validates the signed CAI certificate and certificate chains. At 403, security processor 107 ensures that the CAI certificate is intended for use with IHS 100 (e.g., comparing public keys, serial numbers, etc.). If successful, at 404, security processor 107 activates the appropriate ones of cryptographic algorithms 204, which are then accessible to shim layer 203 via internal API 405.

Figure 5:
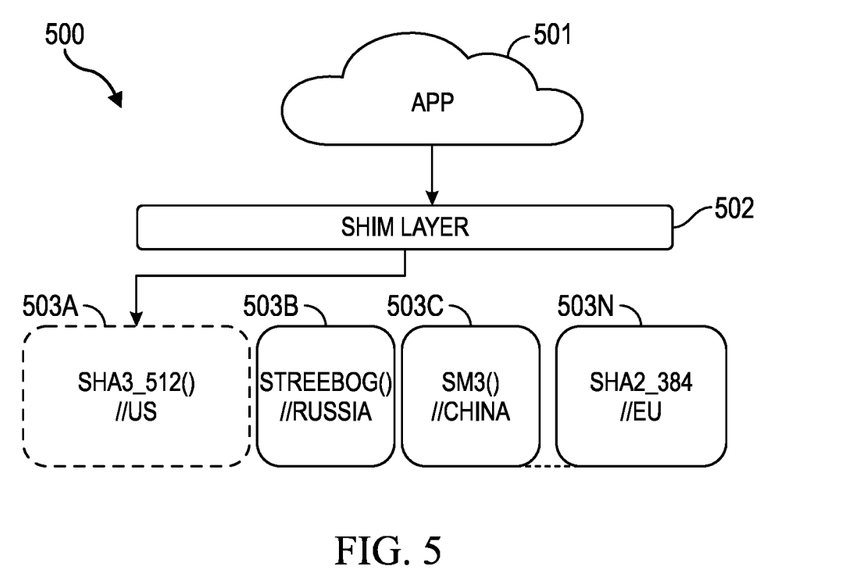
FIG. 5 depicts a diagram of an example of security processor firmware with a selected set of regional cryptographic algorithms activated for runtime use, according to some embodiments.

FIG. 5 depicts a diagram of an example of security processor firmware 500 with a selected set of regional cryptographic algorithms 503A activated for runtime use. Particularly, upon execution of method 400, firmware 500 includes applications 501 coupled to shim layer 502 which can now access only SHA3_512( ) //US algorithm 503A to the exclusion of Streebog( ) //Russia 503B, SM3( ) //China 503C, and SHA2_384 //EU 503N.

Figure 6:
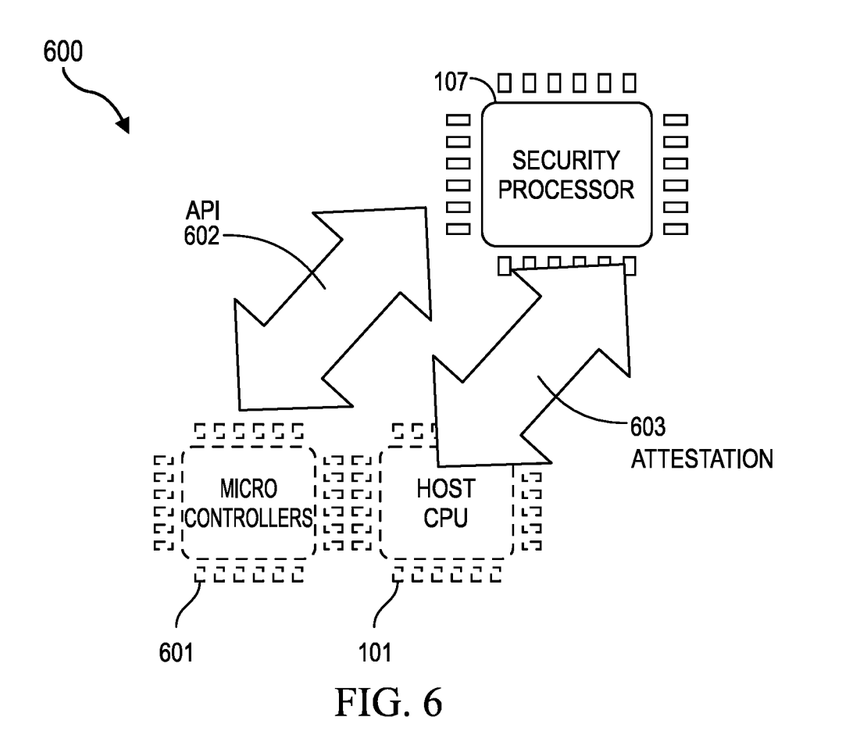
FIG. 6 depicts a diagram of an example of a method for using an activated set of regional cryptographic algorithms, according to some embodiments.

FIG. 6 depicts a diagram of an example of method 600 for using an activated set of regional cryptographic algorithms. To expand modularity to other domains such as host CPU 101 and/or other microcontrollers 601 (e.g., a storage controller, Baseband Management Controller or BMC, etc.), method 600 include a first option for communications using API 602 and a second option via attestation 603.

Using API 602, host CPU 101 and/or other microcontrollers 601 may use security processor 107 directly for cryptographic operations. Using attestation 603, host CPU 101 and/or other microcontrollers 601 ask security processor 107 to prove possession of the CAI private key and/or to also validate the factory certificate chain. In this way other domains external to security processor 107 can have high confidence of which set of cryptographic algorithms they should be running in their own domains, thus providing full product level coverage.

In various embodiments, systems and methods described herein may provide crypto-agility to security processor 107, the ability to rapidly switch between cryptographic algorithms, primitives, and other mechanisms without the rest of the infrastructure being significantly affected, thus ensuring continuity of business amidst rapid geopolitical changes. Additionally, or alternatively, these systems and methods may be used to support long-lived IHSs (10-15 years), which may at some point cease to produce firmware updates (<7 years), thus allowing future cryptographic algorithms to be put in place ahead of being needed, without later requiring hardware or firmware changes to security processor 107.

Systems and methods described herein allow software to pre-enable new cryptographic algorithms without impacting product functionality (e.g., packaged in firmware 200, but not turned on until a later time). These systems and methods reduce the need for hardware or firmware changes to support multiple cryptographic algorithms in security processor 107 (i.e., modularity). Moreover, these systems and methods may promote the creation and maintenance of a single firmware image for security processor 107, instead of many different regional flavors.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a host processor;
a security processor coupled to the host processor; and
a memory coupled to the security processor, the memory having program instructions stored thereon that, upon execution, cause the security processor to:
generate a Cryptographic Algorithm Identity (CAI) key pair comprising a CAI public key and a CAI private key;
issue a CAI Certificate Signing Request (CSR) to a factory IHS, wherein the CAI CSR comprises the CAI public key;
receive a signed CAI certificate from the factory IHS, wherein the signed CAI certificate is usable to activate a selected set of regional cryptographic algorithms among a superset of regional cryptographic algorithms stored, during manufacturing of the IHS, in a firmware of the security processor; and
store the signed CAI certificate.

2. The IHS of claim 1, wherein to generate the CAI key pair, the program instructions, upon execution, further cause the security processor to obtain a unique identifier (ID) from the IHS.

3. The IHS of claim 1, wherein the signed CAI certificate comprises a manifest of the selected set of regional cryptographic algorithms, a location of factory, and a time of creation of the signed CAI certificate.

4. The IHS of claim 1, wherein the set of regional cryptographic algorithms is selected based, at least in part, upon a location of the factory.

5. The IHS of claim 1, wherein the set of regional cryptographic algorithms is selected based, at least in part, upon a geographic region where the IHS is expected to be shipped.

6. The IHS of claim 5, wherein the geographic region is selected from the group consisting of: United States, Russia, China, and Europe.

7. The IHS of claim 1, wherein the superset of regional cryptographic algorithms comprises: a Secure Hash Algorithm 3 (SHA3), a SHA2, a Streebog hash function, and an SM3 hash function.

8. The IHS of claim 1, wherein to determine that the validated CAI certificate belongs to the IHS, the program instructions, upon execution, further cause the security processor to compare a public key or serial number of the IHS against a public key or serial number stored in the validated CAI certificate.

9. The IHS of claim 1, wherein the activated set of selected set of regional cryptographic algorithms is usable by the secure processor to perform a cryptographic operation requested by the host processor via an Application Programming Interface (API).

10. The IHS of claim 1, wherein the program instructions, upon execution, further cause the security processor to:
during boot of the IHS, validate the signed CAI certificate;
determine that the validated CAI certificate belongs to the IHS; and
in response to the determination, activate the selected set of regional cryptographic algorithms.

11. The IHS of claim 10, wherein the program instructions, upon execution, further cause the security processor to:
receive a request to attest a set of cryptographic algorithms usable by the host processor to perform a cryptographic operation; and
in response to the request, prove possession of the CAI private key.

12. The IHS of claim 10, wherein the selected set of regional cryptographic algorithms is different from another set of regional cryptographic algorithms previously activated during manufacturing of the IHS.

13. The IHS of claim 10, wherein activation of the selected set of regional cryptographic algorithms occurs without any changes to the superset of regional cryptographic algorithms.

14. The IHS of claim 10, wherein activation of the selected set of regional cryptographic algorithms occurs without any updates to the firmware.

15. A method, comprising:
sending a Cryptographic Algorithm Identity (CAI) Certificate Signing Request (CSR) to a factory of an Information Handling System (IHS) by a security processor of the IHS, wherein the CAI CSR comprises a CAI public key; and
storing, by the security processor, a signed CAI certificate received from the factory, wherein the signed CAI certificate is usable to activate a selected set of regional cryptographic algorithms among a superset of regional cryptographic algorithms stored in a firmware of the security processor during manufacturing of the IHS.

16. The method of claim 15, further comprising:
during booting of the IHS, validating the signed CAI certificate;
determining that the validated CAI certificate belongs to the IHS; and
in response to the determination, activating the selected set of regional cryptographic algorithms.

17. The method of claim 15, further comprising:
receiving a request to attest a set of cryptographic algorithms used by a host processor of the IHS to perform a cryptographic operation; and
in response to the request, proving possession of a CAI private key by the security processor.

18. A memory storage device having program instructions stored thereon that, upon execution by an Information Handling System (IHS), cause the IHS to:
receive a Cryptographic Algorithm Identity (CAI) Certificate Signing Request (CSR) from a security processor of another IHS serviced or manufactured at least in part by the IHS, wherein the CAI CSR comprises a CAI public key; and
produce a signed CAI certificate usable by the security processor to activate a selected set of regional cryptographic algorithms among a superset of regional cryptographic algorithms stored in a firmware of the security processor.

19. The memory storage device of claim 18, wherein the set of regional cryptographic algorithms is selected based, at least in part, upon a location of the IHS.

20. The memory storage device of claim 19, wherein the set of regional cryptographic algorithms is selected based, at least in part, upon a geographic region where the other IHS is expected to be shipped, and wherein the geographic region is selected from the group consisting of: United States, Russia, China, and Europe.

* * * * *